UNITED STATES PATENT OFFICE.

JAMES MILLAR NEIL, OF TORONTO, ONTARIO, CANADA, ASSIGNOR TO ALEXANDER M. HAY, OF TORONTO, CANADA.

PROCESS FOR THE PRECIPITATION OF PRECIOUS METALS FROM CYANID SOLUTIONS.

1,018,438.      Specification of Letters Patent.      Patented Feb. 27, 1912.

No Drawing.      Application filed May 27, 1911. Serial No. 629,812.

*To all whom it may concern:*

Be it known that I, JAMES M. NEIL, of Toronto, in the county of York and Province of Ontario, Canada, have invented certain new and useful Improvements in Processes for the Precipitation of Precious Metals from Cyanid Solutions; and I hereby declare that the following is a full, clear, and exact description thereof.

This invention is an improvement in processes for precipitating precious metals from cyanid solutions, and its object is to expedite the precipitation of the precious metals and recover them more efficiently than has heretofore been done.

Heretofore the ores containing precious metals have been treated with cyanid and the precious metals thereby dissolved in the cyanid solutions. Thereafter the precious metals have been precipitated from such solutions in various ways,—preferably by percolation of the solution through zinc shavings, or by adding an impure powder known as zinc dust to the solution while in agitation. Zinc dust is an impure powder consisting of more or less metallic zinc and impurities, the latter being inert as precipitating agents.

I have discovered that lead reduced into a finely subdivided or atomized metallic condition, added to cyanid solution in agitation, is a more active agent for the precipitation of the precious metals from the cyanid solution than zinc shavings or zinc dust used as above described. The atomized lead can be added to the cyanid solution in the usual way of introducing precipitants, and the amount of the atomized lead added to the solution will of course be varied according to the strength of the solution and the richness of the ore being treated, sufficient lead being added to insure precipitation of the precious metals. I have also discovered that when atomized lead in metallic form, and zinc dust are both added to a cyanid solution, in agitation, containing precious metals the latter are precipitated more rapidly and efficiently than when either is used alone; and further that when atomized lead and atomized zinc are both added in metallic form to the solution a still more rapid and efficient precipitation of the precious metals takes place.

The means for or method of finely subdividing or atomizing the lead and zinc used in my process is not an essential part of my invention or discovery.

By "atomized" I do not refer to metallic lead in its atomic form as supposed to exist in chemistry, but I mean lead finely subdivided so that it resembles a floury, or substantially impalpable, powder,—yet not oxidized.

In the carrying out of my process lead in atomized metallic form may be used alone, or in combination with zinc dust, but, in order to obtain the best results, I prefer to use finely atomized lead and atomized zinc (both in metallic form) in the proportion of one part of lead to two or more parts of zinc, and add them to the cyanid solution, and agitate same, thereby creating an electrogalvanic action which produces a rapid and efficient precipitation of the precious metals, the latter being replaced in the solution by the excess of zinc, while the lead forms part of the precipitates.

The precipitates containing the precious metals and the lead are then separated from the barren cyanid solution by filtration, or any other desired method. The lead contained in the precipitates acts as a valuable carrying agent in the final treatment of the precipitates.

What I claim is:

1. The improvement in the process of precipitating precious metals from a cyanid solution, consisting in adding a substance containing atomized lead to such solution.

2. The improvement in the process of precipitating precious metals from a cyanid solution, consisting in adding atomized lead and zinc dust to such solution.

3. The improvement in the process of precipitating precious metals from a cyanid solution, consisting in adding atomized lead and atomized zinc to such solution.

In testimony that I claim the foregoing as my own, I affix my signature in presence of two witnesses.

JAMES MILLAR NEIL.

Witnesses:
ARTHUR E. DOWELL,
JAMES R. MANSFIELD.